May 18, 1926.
W. J. P. MOORE
PNEUMATIC TIRE PACKAGE
Filed April 9, 1924    2 Sheets-Sheet 1
1,584,885
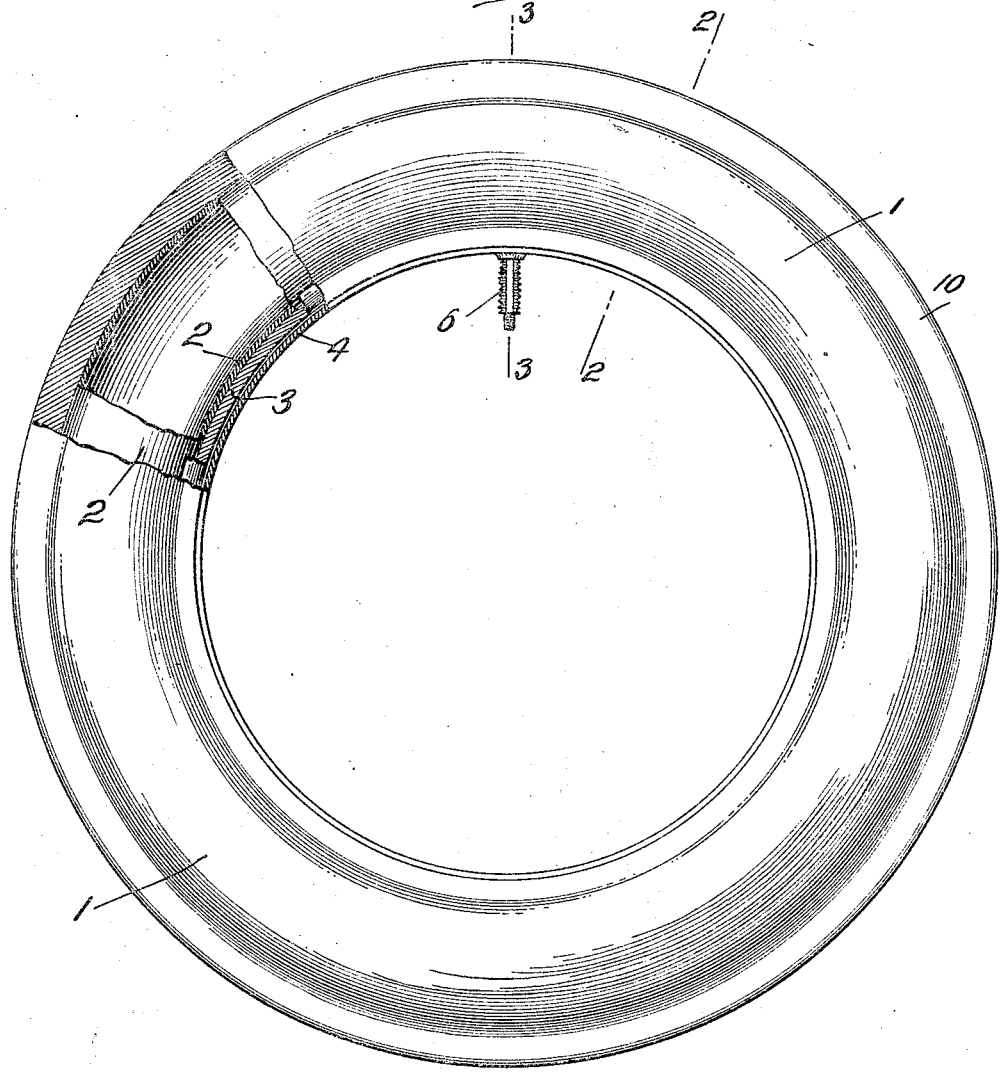
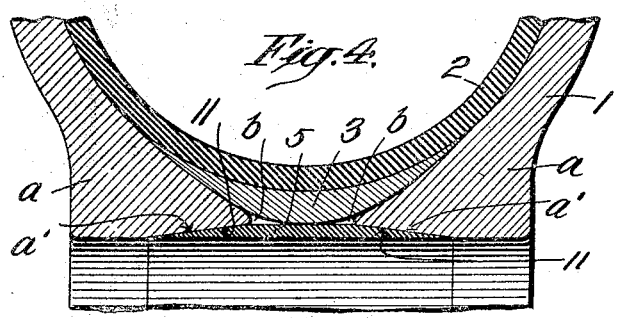
INVENTOR
WILLIAM J. P. MOORE
BY Fred E. Packer
ATTORNEY May 18, 1926.
W. J. P. MOORE
1,584,885
PNEUMATIC TIRE PACKAGE
Filed April 9, 1924    2 Sheets-Sheet 2
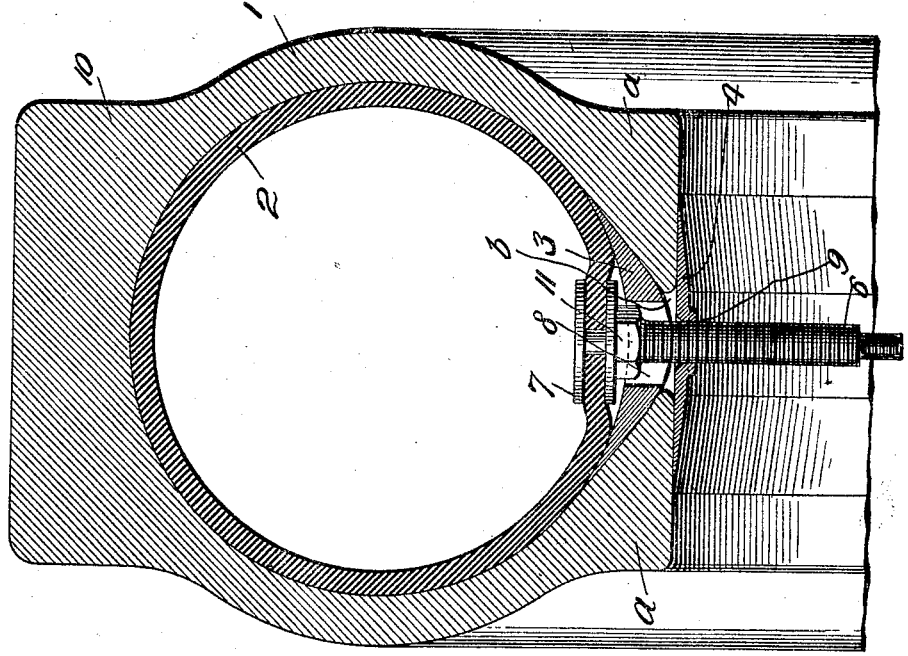
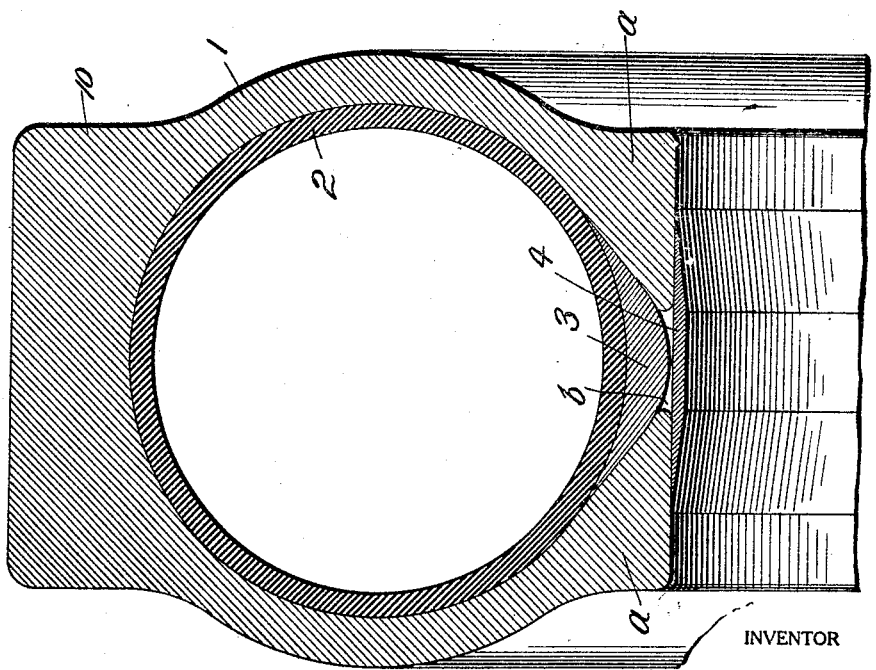
INVENTOR
William J. P. Moore
BY
Fred A. Acker
ATTORNEY Patented May 18, 1926.

1,584,885

UNITED STATES PATENT OFFICE.

WILLIAM J. P. MOORE, OF NEW YORK, N. Y.

PNEUMATIC-TIRE PACKAGE.

Application filed April 9, 1924. Serial No. 705,302.

My present invention relates to tire packages, or packages for a complete pneumatic tire, said complete tire consisting essentially of shoe, inner valved tube and flap; and it has for a leading object among many that may be mentioned to prevent the deterioration of the tires and their several component elements, and protect them from injury at all times from the time of the completion of their manufacture until the end of their use; this protection to continue therefore during the entire period which the pneumatic tire may be in existence, and wherever it may be, whether actually doing service upon the wheel upon the road, or being carried in the warehouse or elsewhere or in possession or storage by the dealer or ultimate consumer, and this protection afforded to the tire, applies with equal effectiveness to all its parts, namely, the outer shoe, the inner tube and its valve, and the flap.

The invention consists fundamentally in providing or affixing, by suitable means to the two inner projecting beads of the outer shoe, a sealing strip or member so attached to these two beads as to prevent moisture and other deleterious foreign materials from entering into the interior of the shoe; and provided the inner tube and flap have been first assembled in the shoe, as will usually be the case, to affix this sealing strip to the two beads of the shoe after such assembly of all these parts, and thus at the same time to effectively protect the inner tube more especially, as that is more easily damaged, as also to protect the flap.

The invention furthermore comprises numerous details and peculiarities in the construction, combination and arrangement of the various parts of the package, and the constituent members, and the method of making the package, substantially as will be hereinafter more fully described, and then claimed.

In the accompanying drawing illustrating my invention,

Figure 1 is a side elevation of my complete tire package for pneumatic tires, with a portion broken away to expose the interior arrangement of the parts.

Figure 2 is an enlarged cross-section of the same on the line 2, 2, of Figure 1.

Figure 3 is a similar enlarged cross-section on the line 3, 3, of Figure 1.

Figure 4 is a similar partial cross-section of a modified form of my improved tire package.

Similar characters of reference designate corresponding parts throughout the different figures of the drawings.

1 denotes the shoe of a pneumatic tire. This shoe may be of any material and construction. It may or may not have the thickened tread 10. Its inner periphery which seats on the wheel rim has the usual opening at $b$, between the parallel beads $a, a$, said opening $b$ allowing entrance to the interior of the shoe for the admission of the usual inner tube 2, having valve appliance 6, and said opening $b$ allowing the insertion of the flap 3, covering the slot $b$ on the inside and between tube 2 and beads $a, a$. These parts are of course all old and well-known, and are given here merely to assist in the explanation of my improved package and to show how my sealing strip is utilized and applied to any existing shoe to complete the package.

4 designates the sealing strip or member. It is a long, narrow elastic strip, of only the proper width to easily cover the circular slot or opening $b$, see Figures 2 and 3, and is adapted to be secured to both of the beads $a$. It may be made of any desired elastic material, as for instance, rubber, or rubber composition, or other equivalent or suitable material; and may be affixed to the shoe 1, on both of the beads $a$, by means of rubber cement, or other adhesive, (or it may be otherwise secured to the shoe), as may be preferred. It should preferably be sufficiently elastic to permit it to be slightly stretched or bent, more or less as may be necessary in mounting the tire upon the wheel rim, or more or less distended during the processes of tube inflation. If there is any expansion of the beaded sides against the rim when full or maximum air pressure is put into the inner tube there will be sufficient give or yield to the sealing strip 4, so that it will not be destroyed or ruptured or lose its protective effect. It is used for the beneficial purpose of protecting the inner tube against moisture while the tire is on the wheel, since the wheel often runs in water or stands in water, a condition which seriously shortens the life of an inner tube, unless the effect can be prevented by keeping the tube dry.

In Figure 3 the section is cut through the tire where the valve stem 6 of the air valve passes through the inner tube 2 and the flap 3. The stem 6 is attached to tube 2 by the usual head plate 7 and nut 11. The flap 3 has an opening 8 through which the stem 6 passes. The sealing strip 4 has likewise a perforation 9 through which passes the valve stem 6. In Figure 2 the section is cut through the complete tire, and is a general cross-section of the shoe, inner tube and flap at every other point of the tire except where the valve passes through these parts.

My sealing strip 4 is thus affixed to the bottom inside of the casing just opposite to the rim, and may be cemented exteriorly to the bottom of any casing already made, or in the case of a newly-designed casing, this may if desired have a recessed and tapered bottom, as at $a'$, $a'$, in Figure 4, to receive the tapered edges 11, 11, of the sealing strip 5, as clearly shown in Figure 4. In every case, when strip 4 has been cemented to the flat bottom of the beads $a$, $a$, of the shoe or casing, and the casing has been mounted on the rim and the tire inflated, the central foot or toe of the casing will become flat against the rim, substantially as shown.

Any standard complete tire, composing shoe, inner tube and flap, or merely shoe and tube, or the shoe alone, can be fitted with a sealing strip, as 4, having a small punched hole or perforation, as 9, to allow the valve stem, to pass through, but fitting tightly around the valve stem, having a lip raised up around the edge of this hole 9, if desired, as shown, so as to prevent water or moisture leaking by the valve stem, and which sealing member, as I have explained, is attached to the inner circumference of the shoe by a suitable rubber cement, gum, or other adhesive, so that the entire strip 4 is firmly attached to the shoe throughout its entire length, and at all times prevents any possibility of exterior water or moisture or other foreign substance from passing into the interior of the tire and destroying or rotting the inner tube. If at any time, on account of a puncture or otherwise, it is found necessary to remove the inner tube from the casing, the sealing strip may be removed or stripped off the shoe, and after repairs or putting in another inner tube, a new sealing strip can be affixed to the shoe, or the old one can be recemented Thus by the simple, novel and inexpensive expedient of sealing a cover, over the central circular slot in the shoe, I convert the tire assembly into a storage or shipping package, without encasing it within any additional carton, box, or covering, since the outer shoe provides all the necessary outer blanketing and efficiently houses the delicate inflatable tube therein just as soon as the inner opening in the shoe is thoroughly closed by the sealed member.

The advantages of my improved tire package to those who handle and use pneumatic tires will be manifest from a brief consideration of the same.

*First, to tire makers.*—A chief advantage in shipping the complete tire with inner tube and flap would be that the tire maker would have assurance that the inner tube and flap were properly assembled and sealed by himself to prevent further tampering with the tire, and the protection of the complete tire would be assured both to him and to the ultimate user, as the sealing strip might have the private mark of the maker as a guarantee. In the inspection and testing of inner tubes, it is now necessary to inflate them, and then completely deflate and fold and pack them in separate boxes. When the inner tubes are once inflated, it would be quicker and cheaper and easier to only partially deflate the inner tube and slip it finally into the casing, and afterwards insert the flap, and thus have a complete casing, inner tube and flap in position and ready for use. Besides this, there results the saving of the expense of the boxes in which the inner tubes are always packed and of the additional time and work required in bundling and packing the flaps. Further, from this point of manufacture onward, the number of pieces to be handled is only one-third that required when the casing, inner tube and flap are handled separately, so that the cost of handling is proportionately reduced. The shipping of the tubes and flaps in the present empty interior of the shoe, free from possibility of damage or injury, saves much space and expense in storage and handling, and gives an even greater protection to the inner tube than would be possible if the inner tubes were packed separately. Since practically all new tires are required with new tubes, my method of packing would do away with nearly all separately packed tubes.

*Second, to tire users.*—The most important advantage to the tire user is the assurance that the shoe, inner tube and flap have been perfectly assembled at the tire maker's plant by experts. As the inner tube has been placed in the shoe, it is protected from external injury and from any deterioration due to air exposure, for the tube is in an airtight package and is not even subject to the usual air deterioration which is one of the most fruitful causes of tire failure, for tubes are often in warehouses or stores for many months before being put into actual service. Moreover, as at present, the tubes when packed are sharply bent and serious damage often results from their being packed away for a long time in boxes. In my package the tube is always kept in its natural shape, perhaps slightly inflated, and in any case always filled with air at atmospheric pressure, and air sealed by the tire valve the same as when in actual service, which slight pressure serves again to keep the shoe or casing in its natural shape and prevents it from being distorted or injured due to any abnormal contact with exterior objects.

My complete pneumatic tire package is always received as a single unit and is immediately ready to be mounted on the wheel without the necessity of the user being compelled to bring together from separate sources these three elements; and of examining and unpacking, unfolding and talcing the shoe and inner tube, slightly inflating the latter, carefully fitting the inner tube and flap into the shoe.

*Third, to the tire dealers.*—The paramount advantage assured to the tire dealers by the use and adoption of my present improved means and method of making tire packages consists in the great economy in handling the tires, since the dealers only have to handle one-third the number of pieces, which reduces the handling expenses approximately to one-third of what they are now. A second economy is derived from the saving in space, as the complete package comprising casing, inner tube and flap would require no more space than the casing alone.

*Fourth, to the automobile makers.*—Generally the advantages secured to all automobile makers by the adoption of my improved tire unit package would be the same as those outlined above for the tire dealers and tire users.

Having thus described my invention what I claim as new and desire to secure by Letters Patent is:

1. As a new article of manufacture, a pneumatic tire comprising a shoe and inner tube, and a sealing member attached to the inner edges of the shoe after the inner tube has been enclosed within the shoe.

2. As a new article of manufacture, a pneumatic tire comprising a shoe and inner tube, and a sealing member for the opening between the inner edges of the shoe, said member being applied to said edges after the tube has been placed within the shoe to prevent moisture and foreign material from entering the shoe and damaging it or the tube.

In testimony whereof I hereunto affix my signature.

WILLIAM J. P. MOORE.